United States Patent
Jung

(10) Patent No.: US 12,443,234 B2
(45) Date of Patent: Oct. 14, 2025

(54) DISPLAY DEVICE

(71) Applicant: Samsung Display Co., LTD., Yongin-si (KR)

(72) Inventor: Siyun Jung, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 204 days.

(21) Appl. No.: 18/082,565

(22) Filed: Dec. 15, 2022

(65) Prior Publication Data
US 2023/0280790 A1 Sep. 7, 2023

(30) Foreign Application Priority Data
Mar. 4, 2022 (KR) .................. 10-2022-0028142

(51) Int. Cl.
*G06F 1/16* (2006.01)
(52) U.S. Cl.
CPC .......... *G06F 1/1652* (2013.01); *G06F 1/1656* (2013.01); *G06F 1/1681* (2013.01)
(58) Field of Classification Search
CPC ..... G06F 1/1652; G06F 1/1681; G06F 1/1656
See application file for complete search history.

(56) References Cited

U.S. PATENT DOCUMENTS

| 2021/0250431 A1* | 8/2021 | Park ................ G06F 1/1652 |
| 2023/0193947 A1* | 6/2023 | Park ................ F16C 11/04 361/807 |
| 2023/0279898 A1* | 9/2023 | Liu ................. H05K 5/0226 361/807 |

FOREIGN PATENT DOCUMENTS

| CN | 209746453 | 12/2019 |
| KR | 1020190004872 | 1/2019 |
| KR | 101971232 | 4/2019 |
| KR | 1020190065641 | 6/2019 |
| KR | 102178724 | 11/2020 |

\* cited by examiner

*Primary Examiner* — Allen L Parker
*Assistant Examiner* — Peter Krim
(74) *Attorney, Agent, or Firm* — CANTOR COLBURN LLP

(57) ABSTRACT

A display device includes a display panel that includes a plurality of display areas and a folding area, a case that is disposed in a lower portion of the display panel, and includes a plurality of rear portions facing the plurality of display areas and a folding portion facing the folding area, at least one pair of hinge structures that are disposed between the display panel and the case, and a groove portion that is disposed in a lower portion of the display panel. A hinge structure of the at least one pair of hinge structures includes a fixed portion fixed to the case, and a trap portion that is connected to the fixed portion, and spaced apart from the groove portion in a folded state of the display panel and caught in the groove portion in an unfolded state of the display panel.

17 Claims, 12 Drawing Sheets

DISPLAY DEVICE

This application claims priority to Korean Patent Application No. 10-2022-0028142, filed on Mar. 4, 2022, and all the benefits accruing therefrom under 35 U.S.C. § 119, the content of which in its entirety is herein incorporated by reference.

BACKGROUND

(a) Field

The disclosure relates to a foldable display device.

(b) Description of the Related Art

In a field of display devices such as liquid crystal displays, organic light-emitting displays, and micro light-emitting displays, flexible display devices including foldable displays that may be bent or folded and unfolded are being actively developed. Such a foldable display device has the convenience of being portable and is in the spotlight as the next generation technology of a flexible display device that may use a large display screen.

Among flexible display devices, a foldable display device can be folded to have a small area when being carried, and can be unfolded to use a wide display area when in use.

SUMMARY

Since the foldable display device is folded and unfolded many times in a folding portion, it is easy to cause defects such as creases around the folding portion.

Embodiments are for preventing occurrence of creases around a folding area of a foldable display device.

A display device in an embodiment includes a display panel that includes a plurality of display areas and a folding area, a case that is disposed in a lower portion of the display panel, and includes a plurality of rear portions facing the plurality of display areas and a folding portion facing the folding area, at least one pair of hinge structures that are disposed between the display panel and the case, and a groove portion that is disposed in a lower portion of the display panel. A hinge structure of the at least one pair of hinge structures includes a fixed portion fixed to the case, and a trap portion that is connected to the fixed portion, and spaced apart from the groove portion in a folded state of the display panel and caught in the groove portion in an unfolded state of the display panel.

In an embodiment, the fixed portion may be fixed on a rear portion of the plurality of rear portions.

In an embodiment, a display area of the plurality of display areas and the folding area may be arranged in a first direction, and the fixed portion may extend in the first direction.

In an embodiment, the fixed portion may have a straight-line shape mainly extending in the first direction on the rear portion, or a curved shape on the rear portion.

In an embodiment, the trap portion may face the fixed portion and may be curved in the opposite direction.

In an embodiment, the hinge structure may further include an extending portion disposed between the fixed portion and the trap portion, and the trap portion may be bent in a direction parallel with the fixed portion in the extending portion.

In an embodiment, a length of the trap portion may be shorter than a length of the fixed portion.

In an embodiment, the hinge structure may further include an extending portion disposed between the fixed portion and the trap portion, and in the unfolded state of the display panel, the extending portion may protrude toward the display panel from the case.

In an embodiment, a hole may be defined in the groove portion, and in the unfolded state of the display panel, the trap portion may be fixed by being caught in the groove portion.

In an embodiment, the groove portion may be disposed corresponding to the trap portion.

In an embodiment, the groove portion may cross the display panel.

In an embodiment, the plurality of display areas may include a first display area and a second display area facing each other with disposing the folding area therebetween, when the display panel is unfolded, the at least one pair of hinge structures may include a first hinge structure disposed between the first display area and the rear portion and a second hinge structure disposed between the second display area and a rear portion of the plurality of rear portions, and when the display panel is unfolded, an end of the trap portion of the first hinge structure and an end of the trap portion of the second hinge structure may face in opposite directions.

In an embodiment, the at least one pair of hinge structures may be provided as the hinge structure in plural, and a plurality of first hinge structures disposed between the first display area and the rear portion and a plurality of second hinge structures disposed between the second display area and the rear portion may be alternately disposed.

In an embodiment, when the display panel is unfolded, a gap between the display panel and the case may be equal to a width from a bottom of the fixed portion of the hinge structure to a top of the trap portion.

A display device in an embodiment includes a display panel that includes a folding area, a first display area, and a second display area, the first display area and the second display area facing each other with disposing the folding area therebetween, a case that includes a folding portion facing the folding area, and a first rear portion and a second rear portion that face each other with disposing the folding portion therebetween, a first hinge structure that is disposed between the first display area and the first rear portion, a second hinge structure that is disposed between the second display area and the second rear portion, a first groove portion that is disposed in a lower portion of the first display area and includes a first hole, and a second groove portion that is disposed in a lower portion of the second display area and includes a second hole, and the first hinge structure includes a first trap portion that is caught in the first hole when the display panel is unfolded, and the second hinge structure includes a second trap portion caught in the second hole when the display panel is unfolded.

In an embodiment, when the display panel is unfolded, the first hole and the second hole may be defined in directions that face each other.

In an embodiment, the first hinge structure may include a first fixed portion fixed on the first rear portion, and the second hinge structure may include a second fixed portion fixed on the second rear portion.

In an embodiment, the first trap portion and the second trap portion may be overlapped when the display panel is folded, and may be spaced apart from each other when the display panel is unfolded.

In an embodiment, the display device may further include a hinge portion disposed on the folding portion.

A display device in an embodiment includes a display panel that comprises a plurality of display areas and a folding area, a case that is disposed in a lower portion of the display panel, and includes a plurality of rear portions facing the plurality of display areas and a folding portion facing the folding area, and at least one pair of hinge structures that are disposed between the display panel and the case and are spaced from each other, and each of the at least one pair of hinge structures includes a fixed portion fixed to the case when the display panel is folded or unfolded, and a trap portion that is spaced apart from the display panel when the display panel is folded and connected with the display panel when the display panel is unfolded. At least one pair of trap portions included in the at least one pair of hinge structures extends the display panel to opposite directions when the display panel is unfolded.

By the embodiments, it is possible to prevent the occurrence of creases around the folding area of the foldable display device.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which:

FIG. 11 is an internal perspective view of an embodiment of a display device in an unfolded state of.

DETAILED DESCRIPTION OF THE EMBODIMENTS

Figure 1:
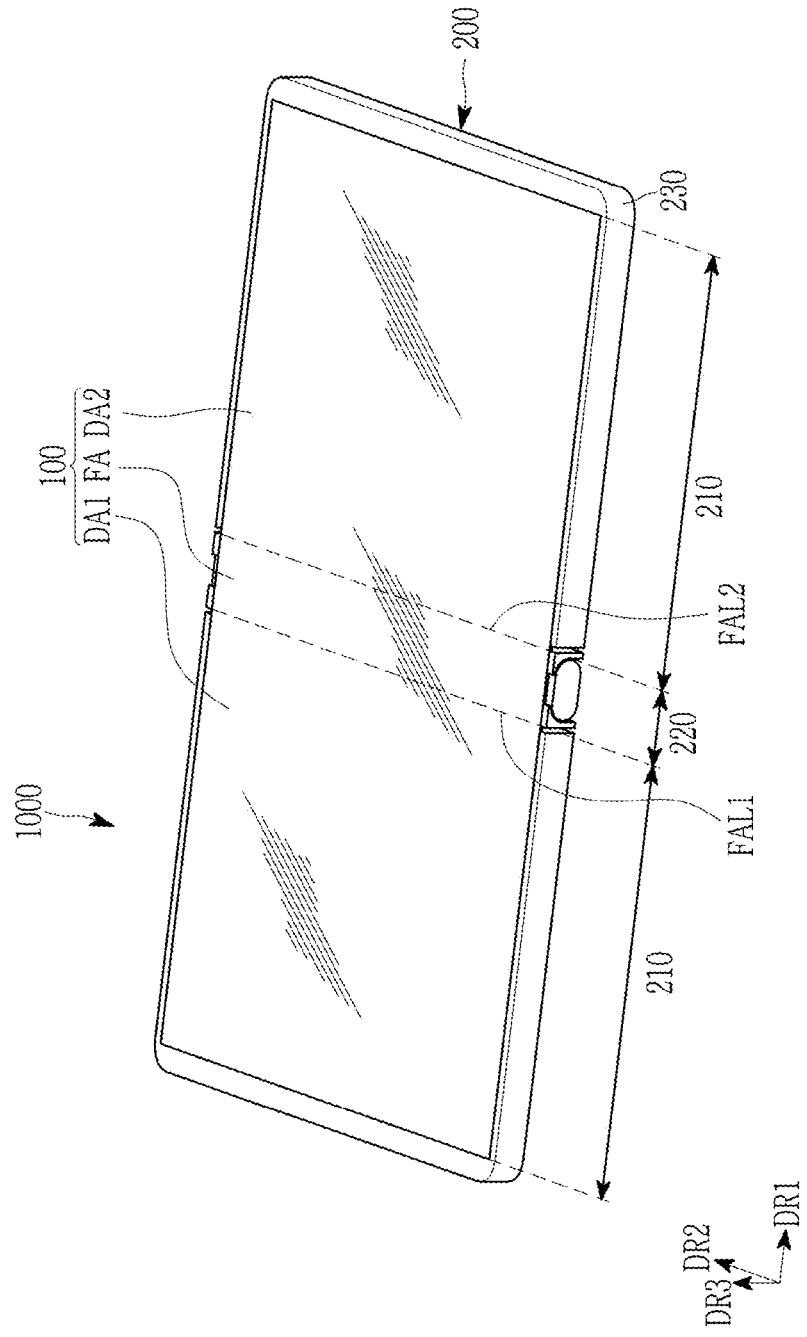
FIG. 1 is an external perspective view of an embodiment of a display device in an unfolded state.

Hereinafter, with reference to the accompanying drawings, various embodiments of the invention will be described in detail such that those of ordinary skill in the art can easily carry out the invention. Embodiments of the disclosure may be implemented in several different forms and is not limited to the embodiments described herein.

The drawings and description are to be regarded as illustrative in nature and not restrictive. Like reference numerals designate like elements throughout the specification.

In addition, since the size and thickness of each configuration shown in the drawings are arbitrarily indicated for better understanding and ease of description, the invention is not necessarily limited to the drawings. In the drawings, the thickness of layers, films, panels, regions, etc., are exaggerated for clarity. In the drawings, the thickness of some layers and regions is exaggerated for better understanding and ease of description.

It will be understood that when an element such as a layer, film, region, or substrate is referred to as being "on" another element, it may be directly on the other element or intervening elements may also be present. In contrast, when an element is referred to as being "directly on" another element, there are no intervening elements present. It will be understood that when an element such as a layer, film, region, or substrate is referred to as being "on" another element, it may be directly on the other element or intervening elements may also be present.

In addition, unless explicitly described to the contrary, the word "comprise", and variations such as "comprises" or "comprising", will be understood to imply the inclusion of stated elements but not the exclusion of any other elements.

Further, throughout the specification, the phrase "in a plan view" means viewing a target portion from the top, and the phrase "in a cross-section" means viewing a cross-section formed by vertically cutting a target portion from the side.

Referring to FIG. 1 to FIG. 7, a display device according to embodiment will be described.

Figure 2:
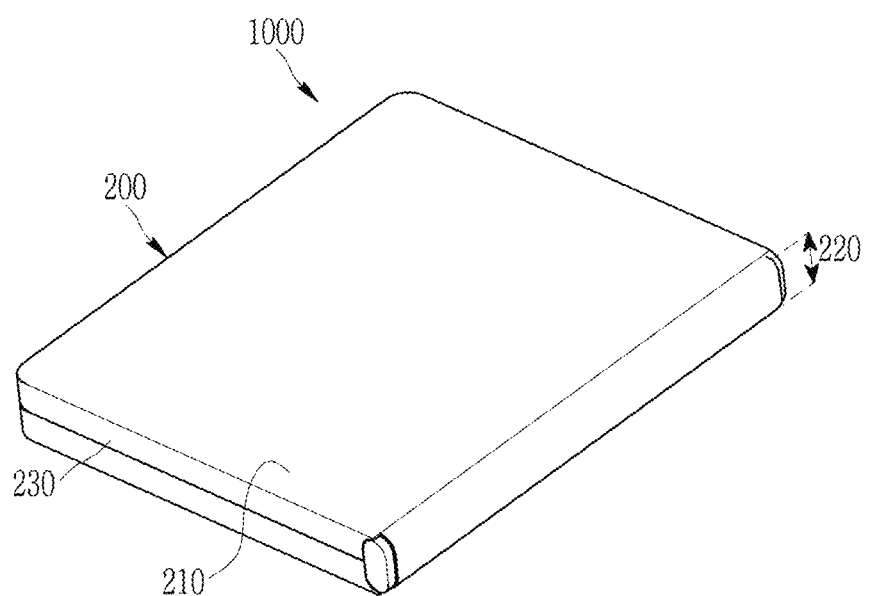
FIG. 2 is an external perspective view of an embodiment of the display device in a folded state.
Figure 3:
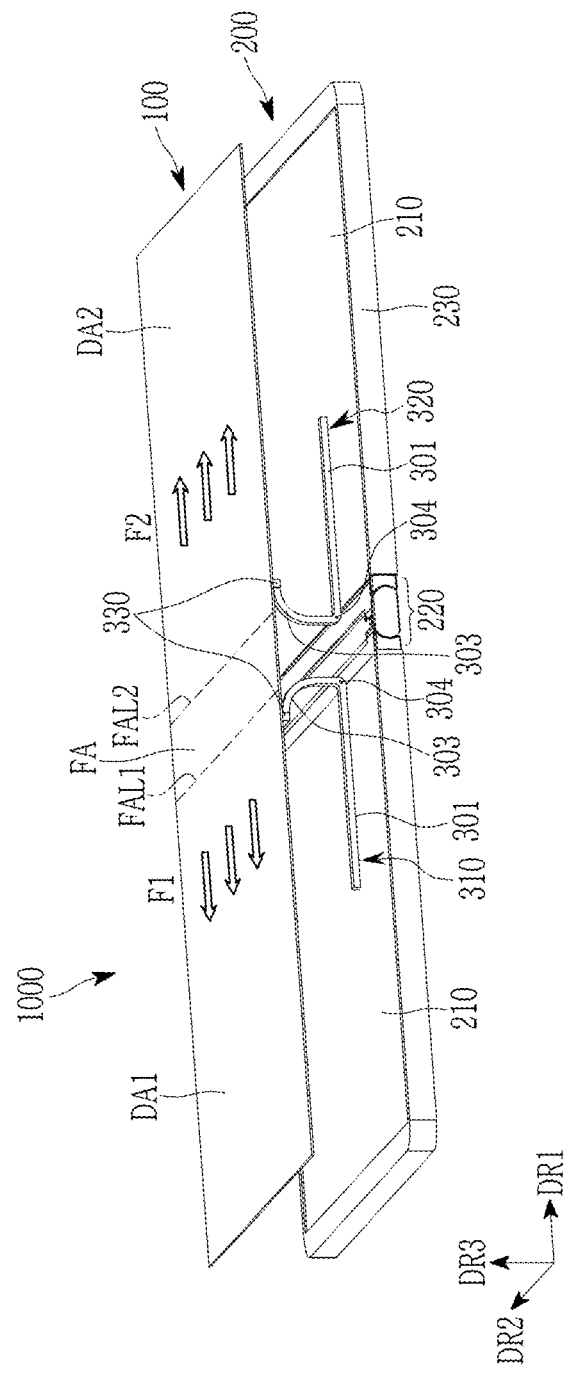
FIG. 3 is an internal perspective view of an embodiment of the display device in the unfolded state.
Figure 4:
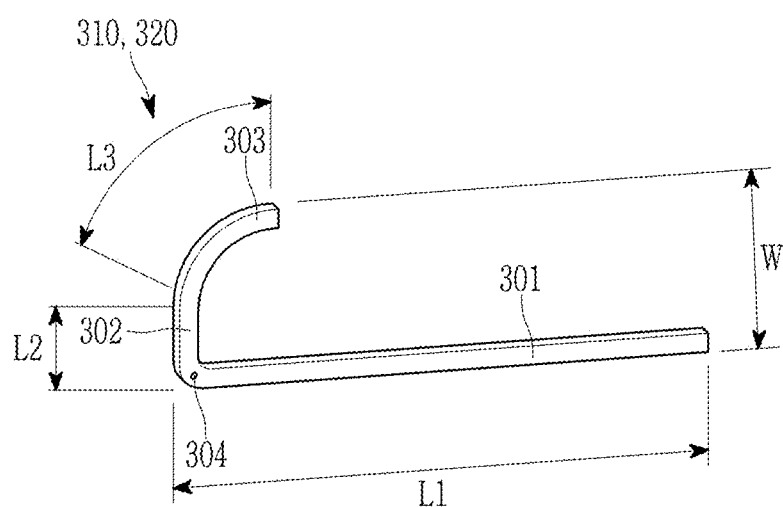
FIG. 4 is a perspective view of an embodiment of a hinge structure of the display device.
Figure 5:
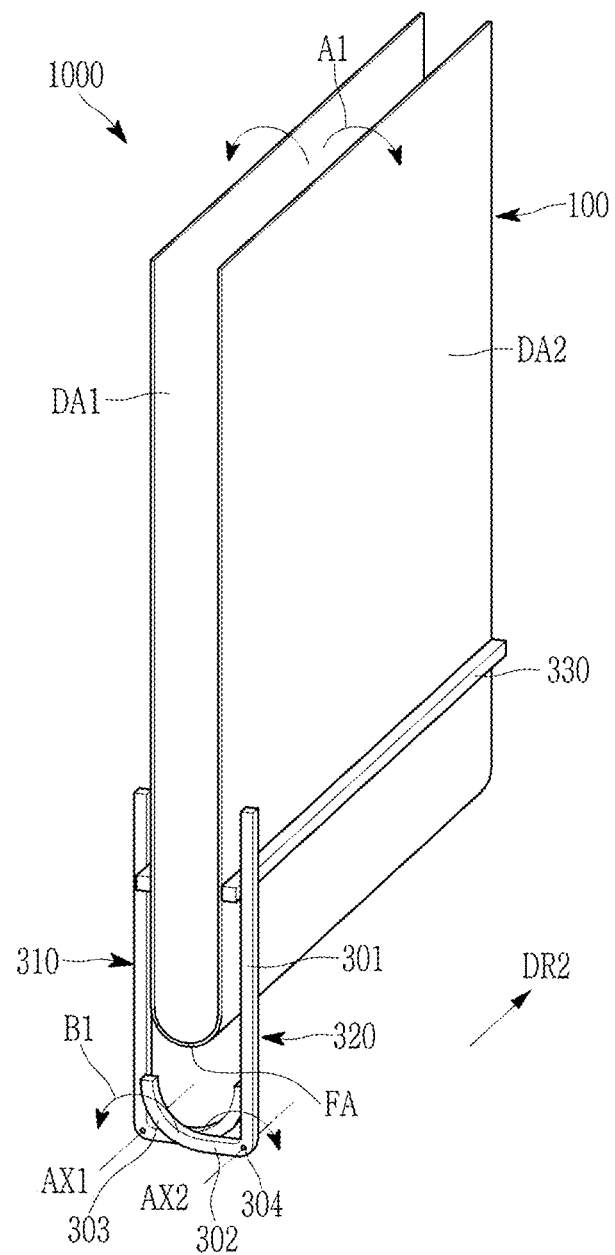
FIG. 5 is an internal perspective view of an embodiment of the display device in the folded state.
Figure 6:
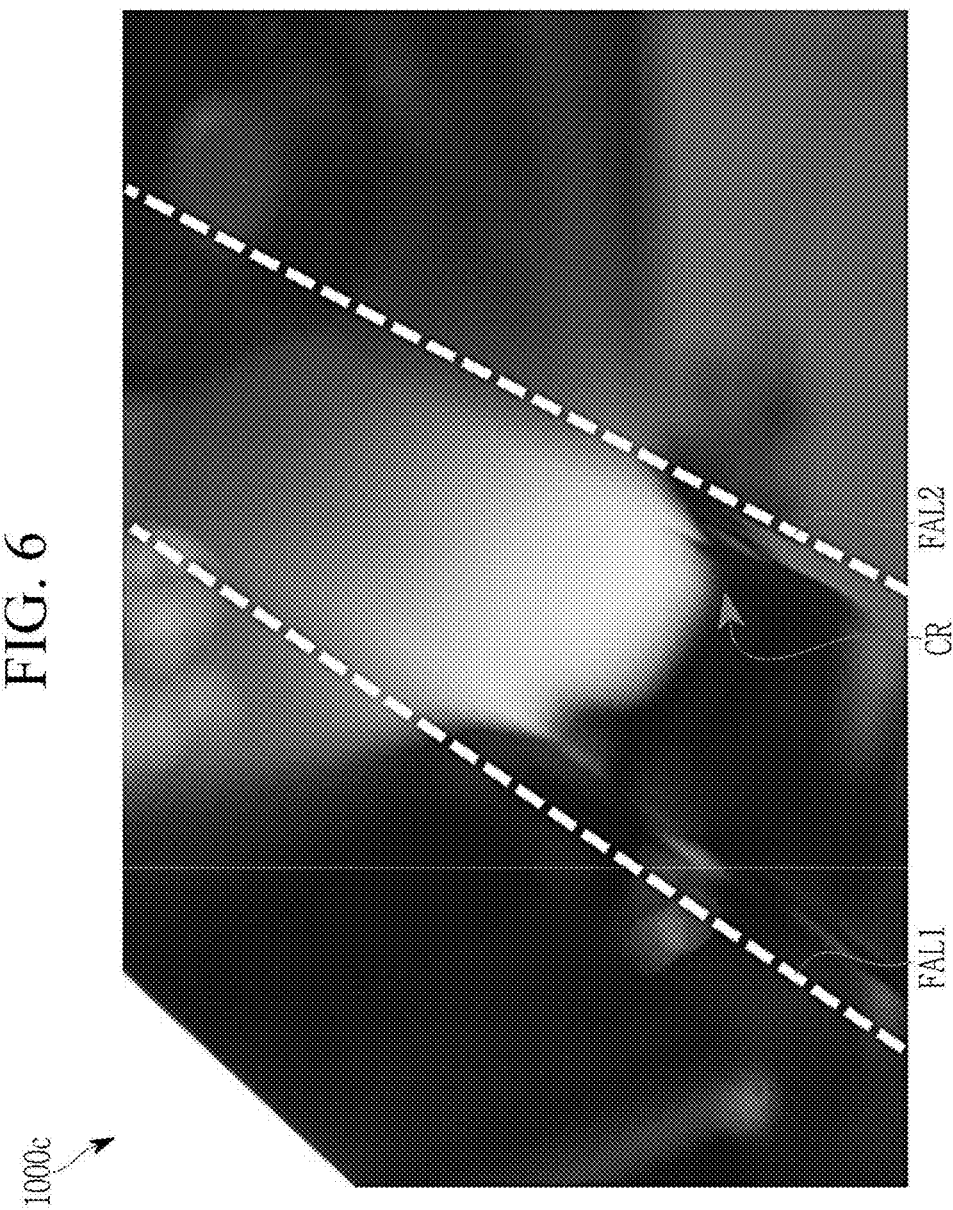
FIG. 6 is a photo that shows creases around a folding portion of a comparative example of the display device.

FIG. 1 is an external perspective view of an embodiment of a display device in an unfolded state, FIG. 2 is an external perspective view of an embodiment of the display device in a folded state, FIG. 3 is an internal perspective view of an embodiment of the display device in the unfolded state, FIG. 4 is a perspective view of an embodiment of a hinge structure of the display device, FIG. 5 is an internal perspective view of an embodiment of the display device in the folded state, and FIG. 6 is a photo that shows creases around a folding portion of a comparative example of the display device.

A display device 1000 in an embodiment is a foldable display device, and includes a display panel 100 and a case 200.

The display panel 100 may include at least one folding area FA, and a plurality of display areas DA1 and DA2. One folding area FA is disposed between two neighboring display areas DA1 and DA2. FIG. 1 illustrates an embodiment in which the display panel 100 includes two display areas DA1 and DA2 and the folding area FA disposed therebetween. The plurality of display areas DA1 and DA2 and the folding area FA may be arranged in a first direction DR1.

The case 200 is disposed under the display panel 100 and may protect and support bottom and side surfaces of the display panel 100. The case 200 may include a pair of rear portions 210 corresponding to the display areas DA1 and DA2 of the display panel 100, and a folding portion 220. The case 200 is also referred to as a housing. The case 200 may further include a side surface portion 230 that covers the side surface of the display panel 100.

The display device 1000 may be folded in the folding area FA and the folding portion 220 as shown in FIG. 2, or may be unfolded as shown in FIG. 1. The display device 1000 may be bent and folded mainly on folding lines FAL1 and FAL2, which form the boundary between the folding area FA and the display areas DA1 and DA2. Bending the display device 1000, the display panel 100, or the case 200 may be referred to as folding, and spreading the display device 100 may be referred to as unfolding.

As shown in FIG. 2, the display device 1000 may be folded by rotating the two display areas DA1 and DA2 and the rear portion 210 disposed on opposite sides with reference to the folding area FA and the folding portion 220. The folding area FA and the folding portion 220 may include at least one rotation axis for folding the display device 1000. Folding lines FAL1 and FAL2 shown in FIG. 1 may be included in at least one rotation axis. When the display device 1000 is folded, the rotation axis may be parallel to the second direction DR2 that is perpendicular to the first direction DR1.

When the display device 1000 is folded, the two adjacent display areas DA1 and DA2 with the folding area FA and the folding portion 220 interposed therebetween may overlap each other. That is, when the display device 1000 is folded, the two display areas DA1 and DA2 may overlap in a third direction DR3, which is perpendicular to the first direction DR1 and the second direction DR2, and the second rear portion 210 of the case 200 may also overlap in the third direction DR3.

Referring to FIG. 1, in the unfolded state of the display device 1000, the display device 1000 may display an image in display areas DA1 and DA2, and the folding area FA may also display an image. The display areas DA1 and DA2 and the folding area FA may display the image as a whole, and some of the display areas DA1 and DA2 and the folding area FA may selectively display an image. A display surface of the unfolded display device 1000 may be parallel to the first direction DR1 and the second direction DR2.

Referring to FIG. 2, in the folded state of the display device 1000, the display surfaces of the two display areas DA1 and DA2 may face each other toward the inside. That is, the display device 1000 may be folded inside. An exterior side of the display device 1000 exposed outside in the folded state may not display an image, or may include an external display surface that may display an image. That is, in the folded state of the display device 1000, the outer surface of the case 200 may include a display surface.

Referring to FIG. 3, the display device 1000 includes a pair of hinge structures 310 and 320 disposed between the display panel 100 and the case 200. FIG. 3 illustrates an embodiment in which one display device 1000 includes a pair of hinge structures 310 and 320, but this is not limited thereto, and one display device 1000 may include two or more pairs of hinge structures 310 and 320.

At least one hinge structure 310 may be disposed between the display area DA1 and the rear portion 210 corresponding to each other, and at least one hinge structure 320 may be disposed between the display area DA2 and the rear portion 210 corresponding to each other. The hinge structure 310 corresponding to the display area DA1 and the hinge structure 320 corresponding to the display area DA2 are not on a straight line but are alternately disposed in the first direction DR1. That is, the hinge structure 310 and the hinge structure 320 may be displaced alternately in the first direction DR1 and in the second direction DR2. The hinge structures 310 and 320 are separated from one another.

Referring to FIG. 3 and FIG. 4, each of the hinge structures 310 and 320 may include a fixed portion 301, an extending portion 302, and a trap portion 303.

The fixed portion 301 is fixed to an upper surface of the case 200 facing the display panel 100. The fixed portion 301 may have an approximately straight-lined bar shape, but is not limited thereto, and may have a meandering shape by being bent at least once in a plan view parallel to the first direction DR1 and the second direction DR2. The fixed portion 301 may mainly extend in the first direction DR1 that is perpendicular to a direction in which the folding area FA and folding portion 220 of the display device 1000 extend.

The extending portion 302 extends from one end of the fixed portion 301 and extends in a different direction from the extension direction of the fixed portion 301. The extending direction of the extending portion 302 may be substantially perpendicular to the extending direction of the fixed portion 301, but is not limited thereto, and may define an acute angle with the fixed portion 301. A length L2 of the extending portion 302 along the extension direction of the extending portion 302 may be shorter than a length L1 of the fixed portion 301 along the extension direction of the fixed portion 301. The extending portion 302 may be fixed to the case 200 such that the fixed portion 301 may be protruded in a direction approximately perpendicular to the surface of the rear portion 210 of the case 200.

A rotation axis opening 304 may be defined between the fixed portion 301 and the extending portion 302. The rotation axis opening 304 may be a place through which the rotation axis, which is the center of rotation of the hinge structures 310 and 320, passes when the display device 1000 is changed from the folded state to the unfolded state, or vice versa, as will be described later.

The trap portion 303 is connected to one end of the extending portion 302 and may be bent. As shown in FIG. 4, the trap portion 303 may be curved forming a curved line in a direction facing the fixed portion 301. A central angle of the bent portion of the trap portion 303 may be about 90 degrees or less. In a state in which the hinge structures 310 and 320 are fixed to the case 200, the trap portion 303 may have portions facing the outside of the display device 1000, that is, facing the opposite direction of the folding portion 220, respectively. Accordingly, the overall shape of each of the hinge structures 310 and 320 may have a shape with a short upper stroke or a lower stroke in approximately the English letter 'J' shape or Korean 'ㄷ' shape.

A length L3 of the trap portion 303 along the extension direction of the trap portion 303 may be shorter than the length L1 of the fixed portion 301 along the extension direction of the fixed portion 301.

The overall thickness of the fixed portion 301, the extending portion 302, and the trap portion 303 may be constant, but is not limited thereto. In another embodiment, at least a portion of the hinge structures 310 and 320 including the fixed portion 301, the extending portion 302, and the trap portion 303 may have a different thickness from the rest. In an embodiment, the fixed portion 301 may have a different thickness from that of at least a portion of the extending portion 302 and the trap portion 303, for example. In an embodiment, a thickness of the fixed portion 301 may be thicker than a thickness of the extending portion 302 or the trap portion 303, for example.

Depending on embodiments, the extending portion 302 of each of the hinge structures 310 and 320 may be omitted. In this case, the curved trap portion 303 may have a shape that is directly protruded from the fixed portion 301.

The hinge structures 310 and 320 may include various materials such as metal, ceramic, plastic, and rubber. The trap portion 303 of the hinge structures 310 and 320 may have elasticity or a material with a low modulus because there is a risk that it may contact the display panel 100 when the display device 1000 is unfolded.

Referring to FIG. 3, at least a pair of groove portions 330 may be disposed under the display panel 100. FIG. 3 illustrates the display device 1000 including a pair of groove portions 300 that are respectively disposed below the respective display areas DA1 and DA2 as one of embodiments.

A hole toward the folding area FA may be defined in each groove portion 330. When the display device 1000 is unfolded, the groove portion 330 disposed under the display area DA1 and the groove portion 330 disposed under the display area DA2 may face each other.

The groove portion 330 may have a shape protruding downward of the display panel 100, or may define a groove inside the display panel 100. The groove portion 330 is fixed to a lower portion of the display panel 100. When the display device 1000 is in the unfolded state, ends of the trap portions 303 of the hinge structures 310 and 320 are caught in the holes of the groove portion 330 to apply a force toward the outside of the display panel 100 to the groove portion 330. The groove portion 330 may be formed in an island shape only in a region corresponding to the trap portion 303, or alternatively, may mainly extend in the second direction DR2. The shape of the extended groove portion 330 is shown in FIG. 5 as one of embodiments.

Referring to FIG. 5, when the display device 1000 is folded, the hinge structures 310 and 320 fixed to the case are also folded, and thus the fixed portions 301 of the respective hinge structures 310 and 320 face each other and are disposed in parallel. In FIG. 5, for convenience, the case 200 disposed outside is omitted, but it may be the same as the state shown in FIG. 2 and the structure shown in FIG. 5 is disposed inside the case 200. Since the two facing hinge structures 310 and 320 are alternately disposed with each other, the extending portion 302 and the trap portion 303 of each hinge structure 310 and 320 in the folded state of the display device 1000 may overlap each other. The extending portion 302 and the trap portion 303 overlapping each other face the folding area FA of the display panel 100. In the folded state of the display device 1000, the ends of the trap portion 303 of the respective hinge structures 310 and 320 are spaced apart from the groove portion 330.

When the display device 1000 in the folded state is unfolded outward as shown by the arrow A1 in FIG. 5, the fixed portions 301 of the hinge structures 310 and 320 fixed to the case simultaneously rotate in the same direction as the arrow B1. In this case, the hinge structures 310 and 320 may rotate around rotation axes AX1 and AX2 passing through the rotation axis opening 304. Accordingly, the extending portion 302 and the trap portion 303 overlapping each other of the hinge structures 310 and 320 are also rotated and no longer stay in the overlapping state.

When the display device 1000 is fully unfolded, as shown in FIG. 3 and FIG. 4, the ends of the trap portions 303 of the hinge structures 310 and 320 are caught in the hole of the groove portion 330. In this case, the extending portion 302 and the trap portion 303 of the hinge structures 310 and 320 that were overlapped in the folding state do not overlap each other in the unfolded state and are spaced apart in the first direction DR1, and a folding area FA or the folding portion 220 may be disposed between the hinge structures 310 and 320 corresponding to each other. In the unfolded state of the display device 1000, the trap portions 303 of the hinge structures 310 and 320 may face the display areas DA1 and DA2, rather than facing the folding area FA in the folded state.

In the unfolded state of the display device 1000, the ends of the trap portions 303 of the pair of hinge structures 310 and 320 respectively corresponding to the two display areas DA1 and DA2 face opposite directions from each other with the folding area FA disposed therebetween. That is, the ends of the trap portions 303 of the pair of hinge structures 310 and 320 may face opposite edges of the display device 1000, respectively.

A gap between the display panel 100 and the rear portion 210 or the folding portion 220 of the case 200 may have enough spacing to dispose the hinge structures 310 and 320 in the folded state of the display device 1000 as shown in FIG. 3. That is, an interval in the third direction DR3 between the display panel 100 and the case 200 may be approximately equal to a width W from the bottom surface of the fixed portion 301 of the hinge structures 310 and 320 to the top surface of the trap portion 303.

Referring to FIG. 6, in the case of a comparative example of a foldable display device 1000c, hinge structures 310 and 320 as in the illustrated embodiment are not included, and the crease CR occurs around the folding lines FAL1 and FAL2 as folding and unfolding are repeated. The crease CR may occur due to deformation of at least some of various layers included in a display panel 100, and for example, the crease CR may occur due to deformation caused by baking deformation of an adhesive layer.

However, in the illustrated embodiment, when the trap portions 303 of the hinge structures 310 and 320 are caught in the hole of the groove portion 330 of the lower portion of the display panel 100, as shown by the arrows F1 and F2 in FIG. 3, the trap portions 303 of the hinge structure 310 and 320 disposed in each of the display areas DA1 and DA2 act to push outward the groove portion 330 and the display panel 100 connected thereto. Accordingly, the display areas DA1 and DA2 on opposite sides of the folding area FA are subjected to tensile stress in the directions of the arrows F1 and F2, which are the outside of the display panel 100, respectively, and thus normal stress occurs in the third direction DR3, thereby preventing sagging of the folding area FA. In addition, it is possible to prevent the occurrence of a crease around the folding area FA, particularly, the folding lines FAL1 and FAL2. Since a separate driving apparatus such as a motor is not desired, it is possible to prevent defects such as a crease and sagging in the folding area of the foldable display device without power consumption, and to improve the external aesthetics.

Figure 7:
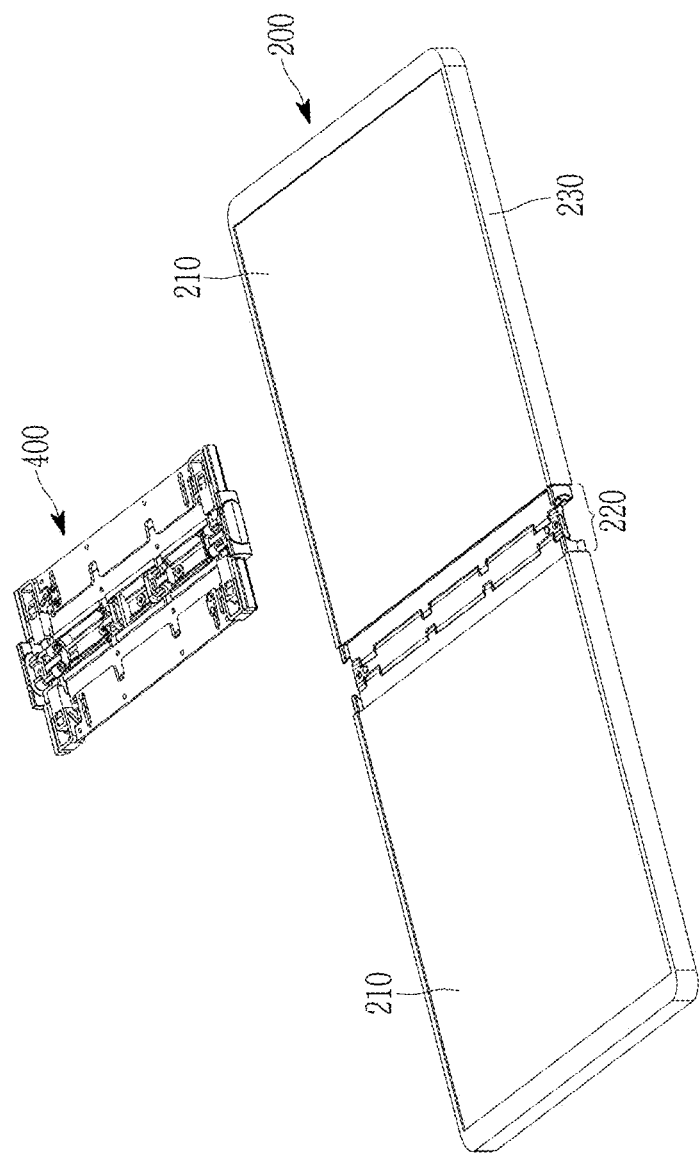
FIG. 7 is an exploded perspective view of an embodiment of the case and a hinge portion according to the display device.

FIG. 7 is an exploded perspective view of an embodiment of the case and a hinge portion according to the display device.

Referring to FIG. 7 together with the above-described drawings, the display device 1000 in the embodiment may further include a hinge portion 400. The hinge portion 400 is disposed between the display panel 100 and the case 200 and may be disposed (e.g., mounted) on an upper surface of the folding portion 220 of the case 200. The hinge portion 400 is a rotation structure for folding and unfolding of the display device 1000, and the hinge portion 400 may include a wing portion connected to the rear portions 210 of the case 200, respectively. In addition, the hinge portion 400 may include a hinge having various shapes and functions for folding and unfolding functions of various foldable display devices, and may have a multi joint or non-joint hinge shape.

The hinge portion 400 may partially overlap a region of the folding portion 220 of the case 200 and the rear portion 210 adjacent thereto. Referring to FIG. 3 and FIG. 7, the hinge portion 400 may be disposed between the hinge structures 310 and 320 corresponding to each other in the unfolded state of the display device 1000, and referring to FIG. 5 and FIG. 7, the hinge portion 400 may be disposed between the extending portion 302 and the trap portion 303 of the hinge structures 310 and 320 overlapping each other and the folding area FA of the display panel 100 in the folded state of the display device 1000.

Figure 8:
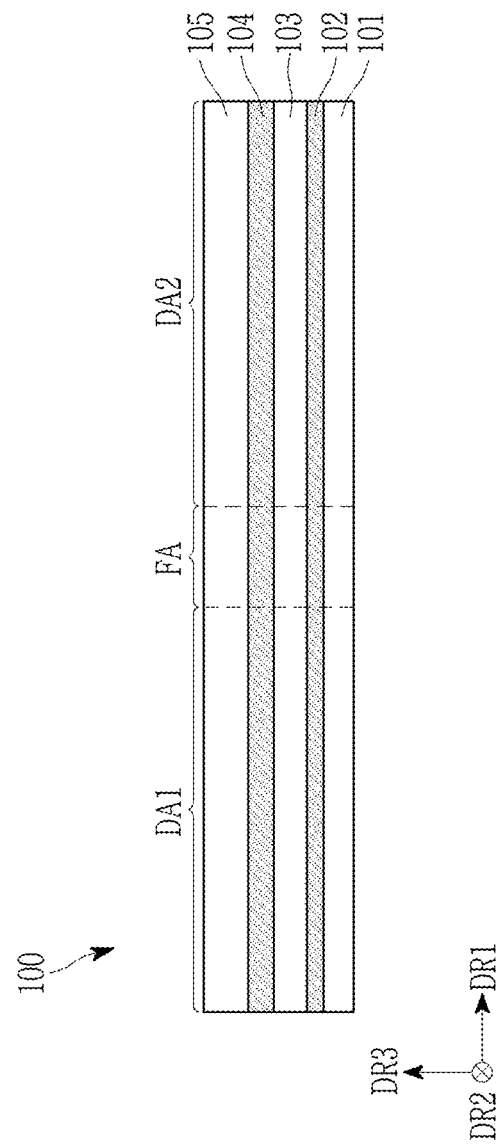
FIG. 8 is a cross-sectional view of an embodiment of a display panel of a display device.

FIG. 8 is a cross-sectional view of an embodiment of a display panel of a display device.

Referring to FIG. 8, a display panel 100 of a display device in an embodiment may include a plurality of layers 101, 102, 103, 104, and 105. The plurality of layers 101, 102, 103, 104, and 105 may include various layers 101, 103, and 105 and adhesive layers 102 and 104 disposed therebetween. The various layers 101, 103, and 105 may include a substrate, a polarization film, a protective film, a touch film, a color filter layer, or the like. The adhesive layers 102 and 104 may include an optically clear adhesive ("OCA"), an optically clear resin ("OCR"), or a pressure sensitive adhesive ("PSA").

Although the shear stress between the various layers 101, 103, and 105 may be resolved during the folding and unfolding operations of the display device by the adhesive layers 102 and 104 of the display panel 100, permanent deformation may occur in the plurality of layers of the display panel 100, particularly the adhesive layers 102 and 104 due to repeated folding and unfolding operations. Accordingly, a crease CR as described above is likely to occur around the folding area FA of the display panel 100. As described above, in the illustrated embodiment, the folding area FA of the display device 1000 that is unfolded by the hinge structures 310 and 320 included in the display device 1000 is prevented from sagging and the occurrence of a crease around the folding area FA may be prevented.

Figure 9:
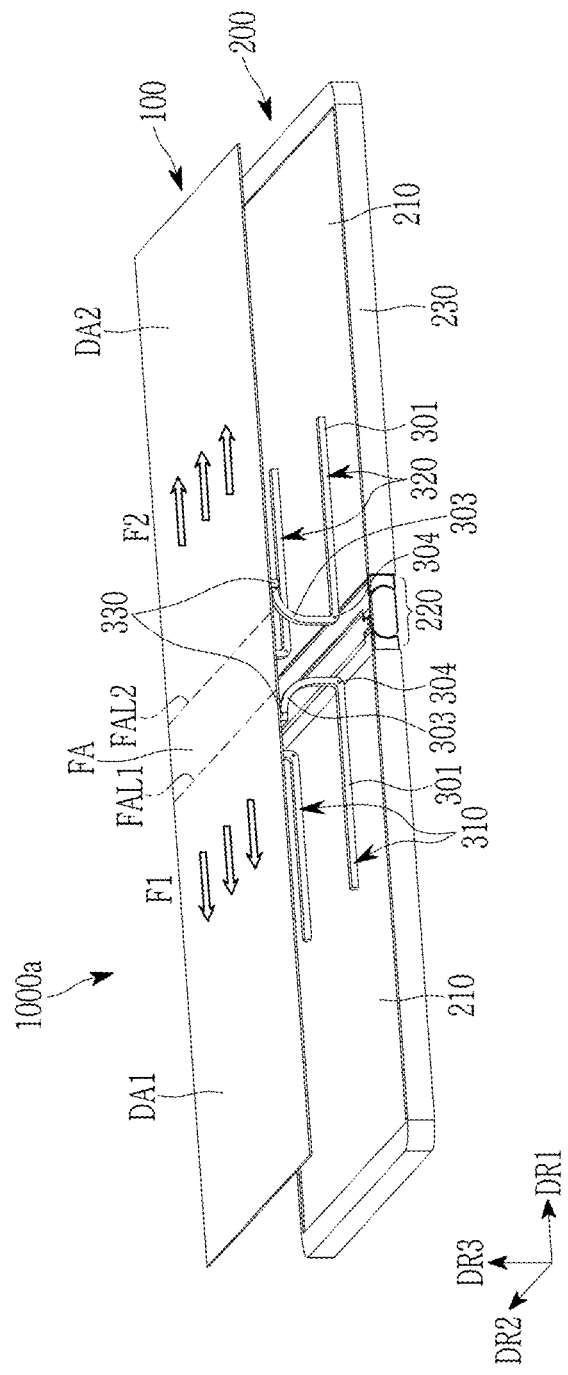
FIG. 9 is an internal perspective view of an embodiment of a display device in an unfolded state.
Figure 10:
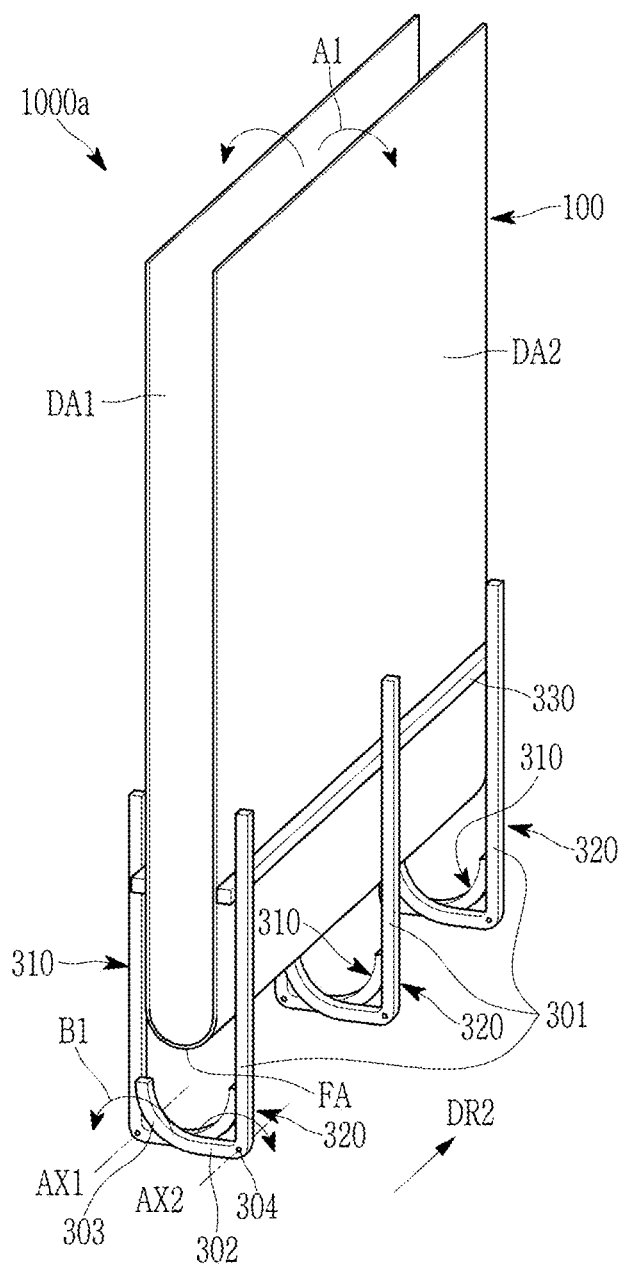
FIG. 10 is an internal perspective view of an embodiment of the display device in a folded state.

Referring to FIG. 9 and FIG. 10, a display device in an embodiment will be described.

FIG. 9 is an internal perspective view of an embodiment of a display device in an unfolded state, and FIG. 10 is an internal perspective view of an embodiment of the display device in a folded state.

Referring to FIG. 9 and FIG. 10, a display device 1000*a* in an embodiment may be mostly the same as the display device 1000 described above, but may include a plurality of pairs of hinge structures 310 and 320.

A plurality of hinge structures 310 or hinge structures 320 disposed corresponding to display areas DA1 and DA2 may be arranged in a second direction DR2 on a rear portion 210 of the display device 1000*a*. When viewed in the first direction DR1, the plurality of hinge structures 310 and the plurality of hinge structures 320 may be arranged alternately in the second direction DR2. Thus, as shown in FIG. 10, when the display device 1000*a* is folded, the hinge structure 310 and the hinge structure 320 do not collide with each other, but are disposed and overlapped in the second direction DR2.

In the illustrated embodiment, a groove portion 330 may have a shape mainly extending in the second direction DR2 across the display panel 100 such that the plurality of hinge structures 310 and 320 may catch trap portions 303. The groove portion 330 may mainly extend in a direction perpendicular to a direction in which fixed portions 301 of the hinge structures 310 and 320 extend.

A hole toward a folding area FA may be defined the groove portion 330. The hole of the groove portion 330 may mainly extend in the second direction DR2, or the hole may be defined only in a portion corresponding to the trap portion 303 of the hinge structure 310. The hole of the groove portion 330 defined under the display area DA1 and the hole of the groove portion 330 defined under the display area DA2 may face each other and may face the folding area FA, respectively.

In addition, the features and functions of the hinge structures 310 and 320 and other constituent elements included in the display device 1000*a* are the same as those of the above-described embodiment, and thus description thereof will be omitted here.

Figure 11:
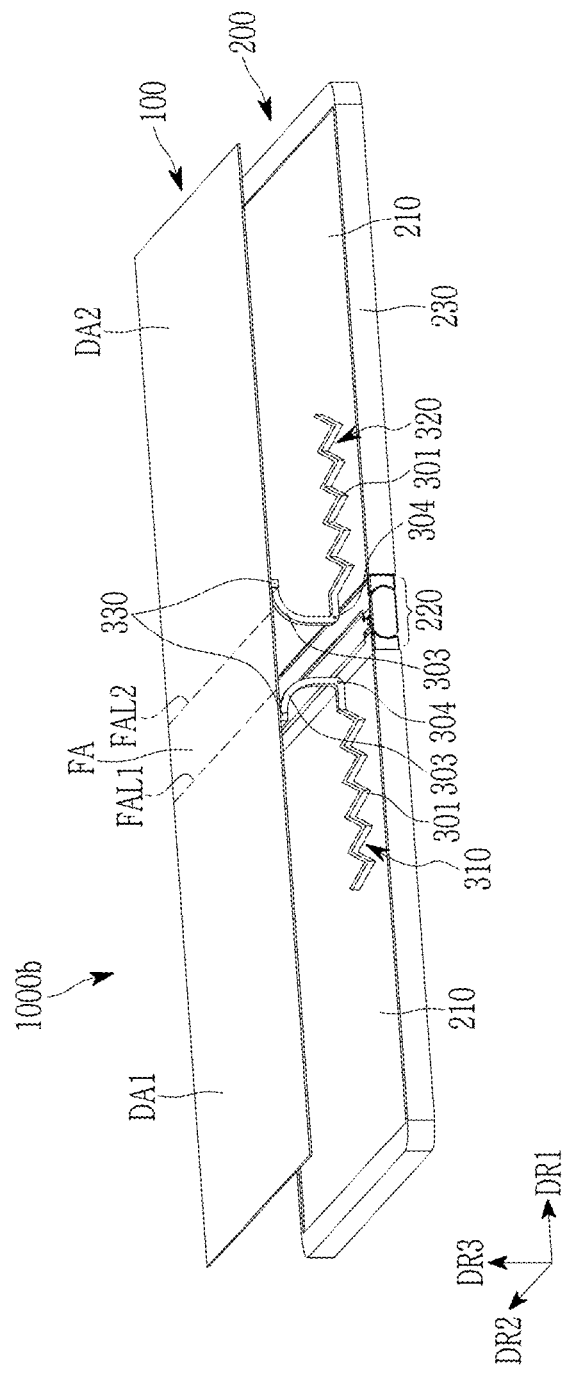

Referring to FIG. 11, a display device in an embodiment will be described.

FIG. 11 is an internal perspective view of an embodiment of a display device in an unfolded state of.

Referring to FIG. 11, a display device 1000*b* in an embodiment may be mostly the same as the display devices 1000 and 1000*a* described above, but shapes of hinge structures 310 and 320 may be different. The fixed portion 301 of the hinge structures 310 and 320 included in the display device 1000*b* in the illustrated embodiment may include a curved portion in a plan view parallel to a first direction DR1 and a second direction DR2. In an embodiment, as shown in FIG. 11, the fixed portion 301 may include a portion having a curved zigzag shape on a rear portion 210, for example. Accordingly, adhesion and fixing force of the fixed portion 301 to the rear portion 210 may be further improved. In another embodiment, at least a part of the fixed portion 301 may have a meandering shape bent with a smooth curved line.

Figure 12:
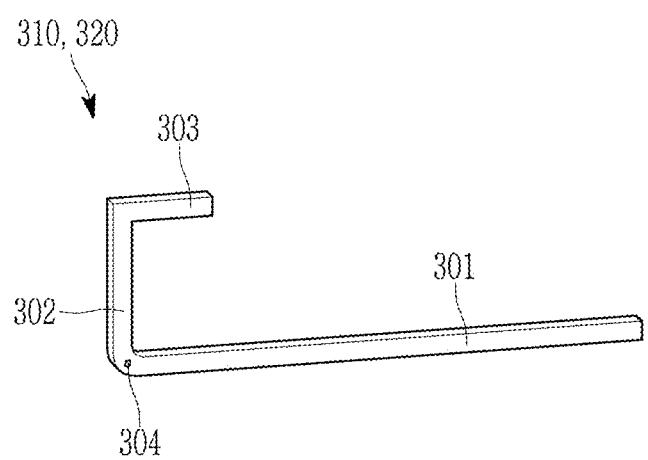
FIG. 12 is a perspective view of a hinge structure of a display device.

Referring to FIG. 12, a display device in an embodiment will be described.

FIG. 12 is a perspective view of an embodiment of a hinge structure of a display device.

Referring to FIG. 12, a display device in an embodiment may be mostly the same as the display devices 1000, 1000*a*, and 1000*b* described above, but the shapes of the hinge structures 310 and 320 may be different. A fixed portion 301 and an extending portion 302 of each of the hinge structures 310 and 320 included in the display device in the illustrated embodiment may have the same shapes as described above, but a shape of a trap portion 303 may be different. In an embodiment, the trap portion 303 may be in the form of a straight line bent in the opposite direction parallel to the fixed portion 301 in an extending portion 302 shown in FIG. 12, for example. An angle defined by the extending portion 302 and the trap portion 303 may be a right angle, or may form another angle smaller than 180 degrees. The angle defined by the extending portion 302 and the trap portion 303 may vary depending on a space and a structure between the display panel 100 and the case 200.

A length of the trap portion 303 may be shorter than the length of the fixed portion 301.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A display device comprising:
   a display panel which includes a plurality of display areas and a folding area;
   a case which is disposed in a lower portion of the display panel, and includes a plurality of rear portions facing the plurality of display areas and a portion facing the folding area;
   a groove portion that is positioned in the lower portion of the display panel, the groove portion including:
      a first surface facing the folding area; and
      a second surface opposite to the first surface; and at least one pair of hinge structures which are disposed between the display panel and the case, a hinge structure of the at least one pair of hinge structures comprising:
- a fixed portion fixed to the case, and
- a trap portion that is connected to the fixed portion, and spaced apart from the groove portion in a folded state of the display panel and caught in the first surface of the groove portion in an unfolded state of the display panel, wherein the trap portion is integrally formed with the fixed portion and is curved from the fixed portion in a direction toward the fixed portion to face and extend parallel to the fixed portion.

2. The display device of claim 1, wherein the fixed portion is fixed on a rear portion of the plurality of rear portions.

3. The display device of claim 2, wherein a display area of the plurality of display areas and the folding area are arranged in a first direction, and the fixed portion extends in the first direction.

4. The display device of claim 2, wherein the fixed portion has a straight-line shape mainly extending in a first direction on the rear portion, or a curved shape on the rear portion.

5. The display device of claim 2, wherein the hinge structure further comprises an extending portion disposed between the fixed portion and the trap portion, and the trap portion is bent in a direction parallel with the fixed portion in the extending portion.

6. The display device of claim 2, wherein a length of the trap portion is shorter than a length of the fixed portion.

7. The display device of claim 1, wherein the hinge structure further comprises an extending portion disposed between the fixed portion and the trap portion, and in the unfolded state of the display panel, the extending portion protrudes toward the display panel from the case.

8. The display device of claim 1, wherein in the unfolded state of the display panel, the trap portion is fixed by being caught in the groove portion.

9. The display device of claim 8, wherein the groove portion is disposed corresponding to the trap portion.

10. The display device of claim 9, wherein the groove portion crosses the display panel.

11. The display device of claim 1, wherein the plurality of display areas comprises a first display area and a second display area facing each other with the folding area therebetween, when the display panel is unfolded, the at least one pair of hinge structures comprises a first hinge structure disposed between the first display area and a rear portion of the plurality of rear portions and a second hinge structure disposed between the second display area and the rear portion, and when the display panel is unfolded, an end of the trap portion of the first hinge structure and an end of the trap portion of the second hinge structure face in opposite directions.

12. The display device of claim 11, wherein the at least one pair of hinge structures is provided in plural, and a plurality of first hinge structures disposed between the first display area and the rear portion and a plurality of second hinge structures disposed between the second display area and the rear portion are alternately disposed.

13. The display device of claim 1, wherein when the display panel is unfolded, a gap between the display panel and the case is equal to a width from a bottom of the fixed portion of the hinge structure to a top of the trap portion.

14. A display device comprising:
a display panel which includes:
- a folding area,
- a first display area, and a second display area facing each other with the folding area disposed therebetween;

a case which includes a portion facing the folding area, and a first rear portion and a second rear portion which face each other with disposing the portion therebetween;

a first hinge structure which is disposed between the first display area and the first rear portion and comprises a first trap portion;

a second hinge structure which is disposed between the second display area and the second rear portion and comprises a second trap portion;

a first groove portion which is disposed in a lower portion of the first display area, the first groove portion including:
- a first surface facing the folding area; and
- a second surface which is opposite to the first surface; and a second groove portion which is disposed in a lower portion of the second display area, the second groove portion including:
- a first surface facing the folding area; and
- a second surface which is opposite to the first surface of the second groove portion, wherein
the first trap portion is caught in the first hole of the first surface of the first groove portion when the display panel is unfolded,
the second trap portion is caught in the first surface of the second groove portion when the display panel is unfolded, and
the first trap portion and the second trap portion are overlapped with each other when the display panel is folded, and are spaced apart from each other when the display panel is unfolded.

15. The display device of claim 14, wherein the first hinge structure comprises a first fixed portion fixed on the first rear portion, and the second hinge structure comprises a second fixed portion fixed on the second rear portion.

16. The display device of claim 14, further comprising a hinge portion disposed on the portion.

17. A display device comprising:
a display panel which comprises a plurality of display areas and a folding area;
a case which is disposed in a lower portion of the display panel, and includes a plurality of rear portions facing the plurality of display areas and a portion facing the folding area;
at least one pair of hinge structures which are disposed between the display panel and the case and are spaced from each other, and a groove portion that is positioned in the lower portion of the display panel, the groove portion including:
a first surface facing the folding area; and
a second surface opposite to the first surface,
wherein each of the at least one pair of hinge structures comprises:
a fixed portion fixed to the case when the display panel is folded or unfolded, and
a trap portion which is spaced apart from the display panel when the display panel is folded and caught in the first surface of the groove portion when the display panel is unfolded,
wherein at least one pair of trap portions included in the at least one pair of hinge structures extends the display panel to opposite directions when the display panel is unfolded, and
the trap portion is integrally formed with the fixed portion and is curved from the fixed portion in a direction toward the fixed portion to face and extend parallel to the fixed portion.

* * * * *